United States Patent [19]
Bolli et al.

[11] Patent Number: 5,657,892
[45] Date of Patent: Aug. 19, 1997

[54] PRESSURE VESSEL CAP

[76] Inventors: Heinz Bolli, Zürichstrasse 59, CH-8184 Bachenbülach; Markus Wyss, Hanflandweg 18, CH-8605 Gutenswil, both of Switzerland

[21] Appl. No.: 211,814

[22] PCT Filed: Aug. 17, 1993

[86] PCT No.: PCT/CH93/00207

§ 371 Date: Apr. 21, 1995

§ 102(e) Date: Apr. 21, 1995

[87] PCT Pub. No.: WO94/04443

PCT Pub. Date: Mar. 3, 1994

[30] Foreign Application Priority Data

Aug. 25, 1992 [CH] Switzerland ............... 2632/92

[51] Int. Cl.⁶ ........................................ B65D 45/24
[52] U.S. Cl. .................. 220/325; 220/326; 292/256.71
[58] Field of Search ............... 292/256.71, 526.75; 220/325, 327, 378, 324

[56] References Cited

U.S. PATENT DOCUMENTS

| | | | |
|---|---|---|---|
| 1,462,783 | 7/1923 | Barbarou | 292/256.71 |
| 1,551,851 | 9/1925 | Schnormeier | 220/324 |
| 1,583,396 | 5/1926 | Demuth | 220/325 X |
| 1,784,480 | 12/1930 | Beyer | 220/325 |
| 1,941,294 | 12/1933 | Eck et al. | 220/325 X |
| 2,475,836 | 7/1949 | Henricksen et al. | 220/378 X |
| 2,528,665 | 11/1950 | Peterson et al. | 220/378 X |
| 3,162,338 | 12/1964 | Grubelic | 220/325 X |
| 3,868,041 | 2/1975 | Knize | 220/324 |
| 4,253,583 | 3/1981 | Lynch | 220/327 X |

FOREIGN PATENT DOCUMENTS

| | | | |
|---|---|---|---|
| 0445977 | 9/1991 | European Pat. Off. | |
| 74466 | 7/1918 | Germany | 220/324 |
| 1936914 | 1/1971 | Germany | 220/324 |
| 3131173 | 8/1985 | Germany | |
| 3516721 | 11/1986 | Germany | |

*Primary Examiner*—Allan N. Shoap
*Assistant Examiner*—Robin A. Hylton
*Attorney, Agent, or Firm*—Speckman, Pauley & Fejer

[57] ABSTRACT

A closure for a pressure vessel having a collar connectable to the pressure vessel and to a cap, a seal disposed in an area where the collar and cap contact each other, and a plurality of clamping elements for generating the surface pressure between the collar and the cap. The collar comprises an integral sealing flange having an upper flat sealing surface and a lower circumferential annular bead at least partially circular in cross-section. A plurality of C-shaped clamps are displaceably, releasably and form-fittingly held on said lower circumferential annular bead. Each C-shaped clamp comprises one pressure screw and constitutes a clamping element. In the operational state of the closure, the C-shaped clamps press on the edge region of the cap resting on the sealing flange of the collar.

10 Claims, 2 Drawing Sheets

PRESSURE VESSEL CAP

BACKGROUND OF THE INVENTION

1. Field of the Invention

This invention relates to pressure vessels and, in particular, to closures for pressure vessels. Pressure vessels of different sizes and strengths depending on the amounts treated therein and on the pressures utilized during process, are utilized in the chemical and other process technology industries in a variety of applications. Accordingly, the closures for such process vessels must be adapted to satisfy a variety of conditions.

2. Description of Prior Art

Closures for pressure vessels having a collar which can be connected to the pressure vessel and a cap, a seal disposed in the area where the cap and the collar contact each other, and a plurality of clamping elements for generating a surface pressure between the collar and the cap are known. These known closures are mostly relatively complicated welded structures which, although they have been dimensioned and calculated beforehand, must later on be checked during extensive tests, even though the type per se has been accepted. In addition, closures of this type require long processing times which result in high manufacturing costs.

In most cases, the caps of such closures, if they are pivotably hinged on the collar, are provided with a hinge mounted on welded-on brackets, which, when the cap is opened, hit the wall of the vessel, which may lead to deformations.

The clamping elements by which the cap is pushed closed, usually are lever systems which are fixed in place, welded on the collar and pivotably attached and are expensive and cannot be changed. The number of the clamping elements cannot be changed, even if the cap is exchanged. In most cases, the entire closure must be replaced, provided this is possible at all.

SUMMARY OF THE INVENTION

Accordingly, it is an object of this invention to provide a closure for pressure vessels of the type described hereinabove which overcomes the disadvantages mentioned.

This object is attained by closure for pressure vessels comprising a collar which can be connected to the pressure vessel, a cap, a seal disposed in the area where the cap and the collar contact each other and a plurality of clamping elements for generating a surface pressure between the collar and the cap. The collar comprises an integral sealing flange having an upper flat sealing surface and a lower circumferential annular bead having at least a partially circular cross section. A plurality of C-shaped clamps are displaceably, releasably and form-fittingly secured on said lower circumferential annular bead, thereby constituting clamping elements. In an operational state, the clamping elements press on an edge portion of the cap resting on the flange of the collar. Because the cap and the collar are separate structures, and because the plurality of clamping elements which engage the collar are displaceable and removable, different caps of different thickness with a differing number of clamping elements can be installed. Variation of the cap is also possible where the collar is a ring which can be welded to the pressure vessel.

However, the collar can also be embodied as a ring which can be screwed on the vessel. In this case the vessel is provided with a flange on which the collar is exchangeably fastened. In this way, it is possible to provide a certain amount of variation in the collar diameters.

Because every cap is designed for a specific pressure and therefore, must have the correct number of clamping elements for engaging the correct places, the cap of the closure in accordance with one embodiment of this invention comprises an edge portion forming a circumferential positioning groove which, in an operational state, is engaged by an interlocking, centered, annular bar projecting beyond the sealing surface of the sealing flange of the collar. This embodiment also prevents pinching and destruction of seals as is known to occur during closing of known closures for pressure vessels.

In accordance with another preferred embodiment of this invention, the annular bar is disposed on the flange, offset inward in relation to an inner edge of said flange by at least the width of a groove, semi-circular in cross section, into which an O-ring seal is inserted, thereby satisfying the requirements of a sterile closure. In accordance with another embodiment of this invention, a closure having a particularly strong seal is provided where a circumferential groove having less than semicircular cross section is formed by the underside of the cap. In an operational state of the closure, the circumferential groove is disposed above the corresponding groove formed by the flange of the collar.

The clamping elements transfer forces into the collar in a particularly advantageous manner in accordance with another embodiment of this invention in which the upper leg of the C-shaped clamp of the clamping element forms a threaded opening while the lower leg of the C-shaped clamp forms a mouth which encloses the annular bead, wherein the center axis of the threaded opening centrally intersects the mouth in the lower leg are realized.

So that the clamping elements are secure against unintentional removal from the collar, but still are removable, the closure in accordance with yet another embodiment of this invention comprises the clamping element having a pin which delimits the mouth of the C-shaped clamp, causing the form fit of the mouth around the annular bead over more than 180°.

However, the cap can be connected to the collar by a hinge without losing the advantages of the invention. In accordance with one embodiment of this invention, the portion of the C-shaped clamp connecting the two legs thereof is cut and connected by a hinge axis, thereby forming a hinge from the clamping element. To make the opening process easier, the hinge axis is constituted by a dowel screw surrounded by a spiral compression spring.

BRIEF DESCRIPTION OF THE DRAWINGS

These and other objects and features of this invention will be better understood from the following detailed description taken in conjunction with the drawings wherein.

DESCRIPTION OF PREFERRED EMBODIMENTS

As already stated, the design of the closure of this invention is independent of the shape of the pressure vessel. This applies fully to the cap 2, while the collar 1 is either fastened in a fixed manner, i.e. welded, or removably fastened on the pressure vessel. If the opening of the pressure vessel already has a connecting flange, the collar 1 of the closure can also be provided with a fastening flange 10.

Figure 3:
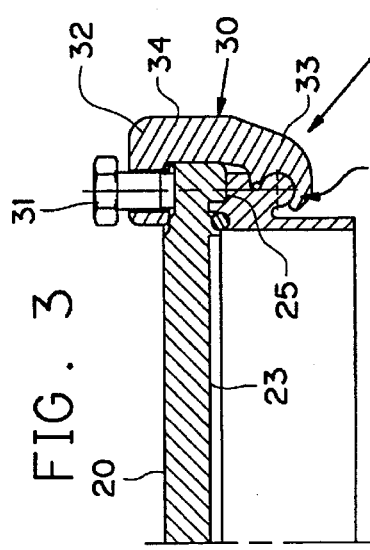
FIG. 3 is a cross-sectional side view of a clamping element in closed position in accordance with one embodiment of this invention.
Figure 4:
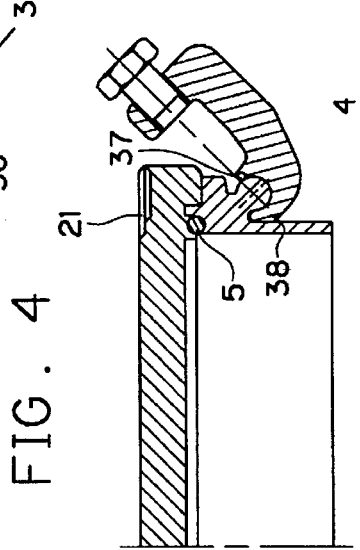
FIG. 4 is a cross-sectional side view of a clamping element in accordance with one embodiment of this invention in an open position.

First, the collar 1 will be described. The collar 1 comprises, except for a fastening flange which, depending on the design, is optional, a cylindrical wall 11 with a sealing flange 12 at the upper end. The sealing flange 12 has a flat sealing surface 13 at the top. The flat sealing surface 13 is bordered on the outside by the flange edge and on the inside by a concentric annular bar 14 which is raised above the flat sealing surface 13. At the bottom of the sealing flange 12, an essentially circular annular bead 15 is formed which circles the sealing flange 12 on a neck 16. The maximum width of the neck 16 is less than the diameter of the cross section of the annular bead 15. The annular bead 15 is connected by the neck 16 to the sealing flange 12 in such a way that it projects downward and away from cylindrical wall 11 at an angle of approximately 45° from the horizontal. A circumferential space 17 remains behind the annular bead 15 and between it and the cylindrical wall 11 of the collar 1. Finally, a groove 18, which is semi-circular in cross section and is also circumferential, is formed by the sealing surface 13 in the area between the inner edge of the cylindrical wall 11 and the annular bar 14 which extends concentrically with it. The semi-circular groove is used to receive an O-ring 5 (see FIGS. 3 to 5), which provides the seal between the collar 1 and the cap 2.

The cap 2 is preferably turned on a lathe from a circular, one-piece plate. Its surface 20 is flat with the exception of recessed pressure surfaces 21 which are evenly distributed around the circumference, the diameters of which are of such a size that they are cut off by the edge of the cap 2. Cup-shaped receptacles 22 are formed in the center of the recessed pressure surfaces, recessed by approximately 2 mm and located completely within the circumference of the cap 2.

The underside 23 of the cap 2 is also slightly recessed in the area which comes to rest above the interior of the collar 1, by which a thickened edge zone 24 is created. At the periphery of this thickened edge zone 24, a flat sealing and pressure surface 25 is provided, which in the closed state of the closure rests flat on the sealing surface 13 of the collar 1. The flat sealing and pressure surface 25 is limited toward the center by an angular groove 26 into which the annular bar 14 of the collar 1 fits interlockingly. Another receiving groove 27 for the O-ring seal 5, which in cross section is at least approximately semi-circular, is formed by the sealing surface 25 adjoining the annular groove 26 in the direction toward the center. The annular groove 26 is slightly deeper than the height of the annular bar 14 at the collar 1, so that the elastic travel of the compressed O-ring seal 5 can be received without being crushed. Accordingly, the groove 18 in the collar 1 and the annular groove 26 in the cap 2 are of such size that in the closed state of the closure an annular gap towards its inside remains. Therefore, when the sealing and pressure surfaces of the cap 2 and collar 1 rest on each other, the O-ring seal 5 can partially escape into the annular gap.

In accordance with the standards for pressure vessels, such a closure is considered a sterile closure. Because of the special design of the edge zone 24 of the cap 2 and the sealing flange 12 of the collar 1, the O-ring seal 5 cannot be broken even if the cap 2 does not rest on or strike the collar 1 correctly. Only if the annular bar 14 correctly engages the annular groove 26 can the seal be squeezed.

The collar 1 and the cap 2 are sealingly kept together by a plurality of clamping elements 3. The clamping elements 3 have the form of C-shaped clamps 30 with a pressure screw 31. Thus, the clamping element 3 is formed from a C-shaped clamp 30 and the pressure screw 31. The clamps can be turned by a lathe out of a full ring and only need to be cut into sections later.

The C-shaped clamps 30 have a lower leg 33, an upper leg 32 and a connecting part 34 connecting the lower leg 33 and the upper leg 32. The upper leg 32 extends perpendicularly away from the connecting part 34, while the lower leg 33 encloses an obtuse angle together with the connecting part 34.

The upper leg 32 forms a centered threaded opening 35 and the lower leg 33 forms a mouth 36 of at least approximately semi-circular cross section. This mouth 36 extends in a curve corresponding to the radius of curvature of the annular bead 15 so that the mouth 36 fits on the annular bead 15 of the collar 1 in a form-fitting manner.

Because of the inclined position of the lower leg 33 and of the annular bead 15, the mouth 36 engages the annular bead 15 from behind. In addition, the center axis of the threaded opening 35 in the upper leg 32 centrally intersects the mouth in the lower leg 33. This causes an optimum introduction of force. On one side, the mouth 36 of the C-shaped clamp 30 is delimited by a tangential pin 37 which, in the closed state of the closure, rests against the neck 16 and now closes the mouth 36 over slightly more than 180°, so that the C-shaped clamp 30 can only be removed from the annular bead 15 after the tangential pin 37 has been removed. On the side of the mouth 36 opposite tangential pin 37, the mouth 36 has a lip 38. In the open state of the closure, when the clamp is pivoted outward around the annular bead 15, lip 38 engages the space 17, as a result of which the pivot angle of the C-shaped clamp is limited.

Figure 5:
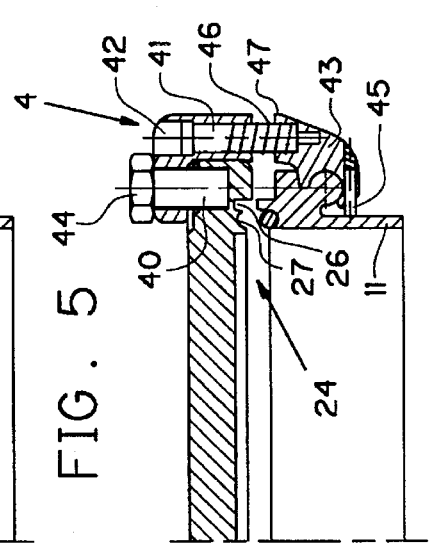
FIG. 5 is a cross-sectional side view of a clamping element with a design of the hinge, in accordance with one embodiment of this invention.

Thus, in accordance with one embodiment of the closure of this invention, the C-shaped clamps can be simply pivoted outward after the pressure screws 31 have been loosened, and the cap 2 can be lifted off. If a new cap for higher pressures to be installed, it may merely be thicker and have more pressure surfaces 21 distributed over its circumference, but it can be held with the same C-shaped clamps. Either additional clamps are seated on the annular bead 15 or, if required, already mounted clamps are used, which previously were in excess. The excess clamps do not get in the way of closing. The design also permits movement of the clamps to any desired location. This is particularly advantageous if the collar 1 and the cap 2 are connected by a pivot hinge 4, as shown in FIGS. 5 and 6.

To construct the closure with a pivot hinge 4, only the provision of a blind bore 40 with an interior thread is needed on the cap 2. The actual pivot hinge 4 is formed by a modified C-shaped clamp. Accordingly, the respectively identical elements will not be described again. The connecting part of the C-shaped clamp is cut perpendicular to its direction of extension. The axis of the pivot hinge 4 is constituted by a dowel screw 41 which holds the two clamp parts together. The dowel screw 41 thus completely extends through the upper clamp part 42, which is fixedly connected to the cap 2 by the fastening screw 44, and is screwed into the lower clamp part 43, which is fixedly maintained on the annular bead 15. A support bolt 45 extends through the lower clamp part 43 and is supported on the wall 11 of the collar 1.

A compression spring 46 is disposed between the upper and lower clamp part of the pivot hinge 4, through which the dowel screw 41 extends in a supporting manner. The ends of the compression spring 46 are held in respective recesses 47 in the two clamping parts which form the halves of the hinge.

Figure 1:
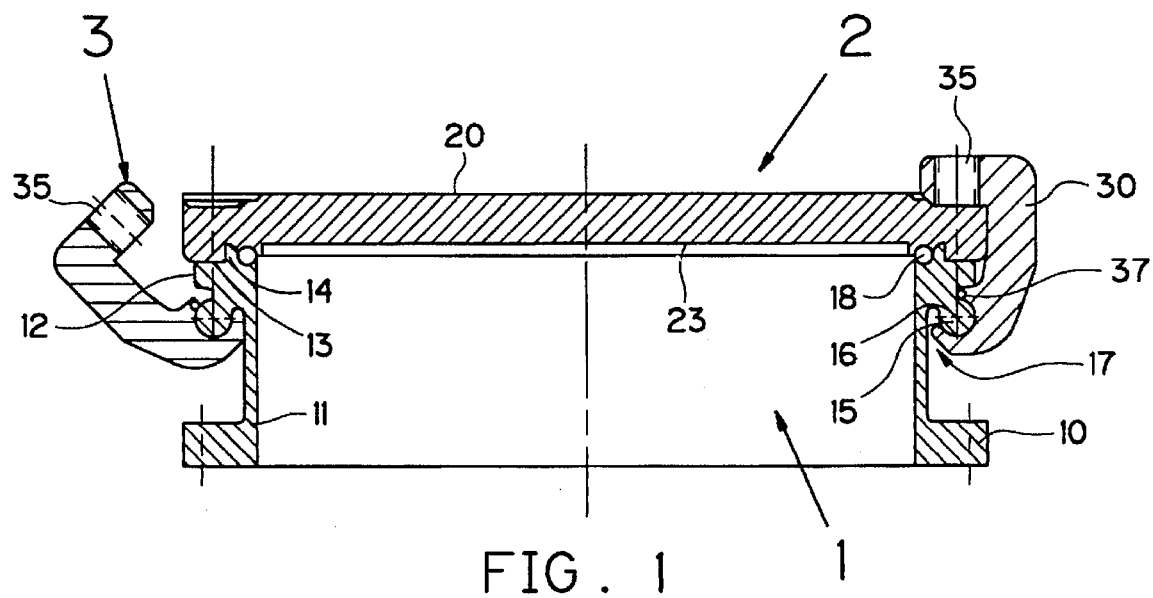
FIG. 1 is a vertical cross section through a closure in accordance with one embodiment of this invention with a collar which can be screwed on and having two clamping elements, one of which is shown in an open position and a other of which is shown in the closed position.
Figure 2:
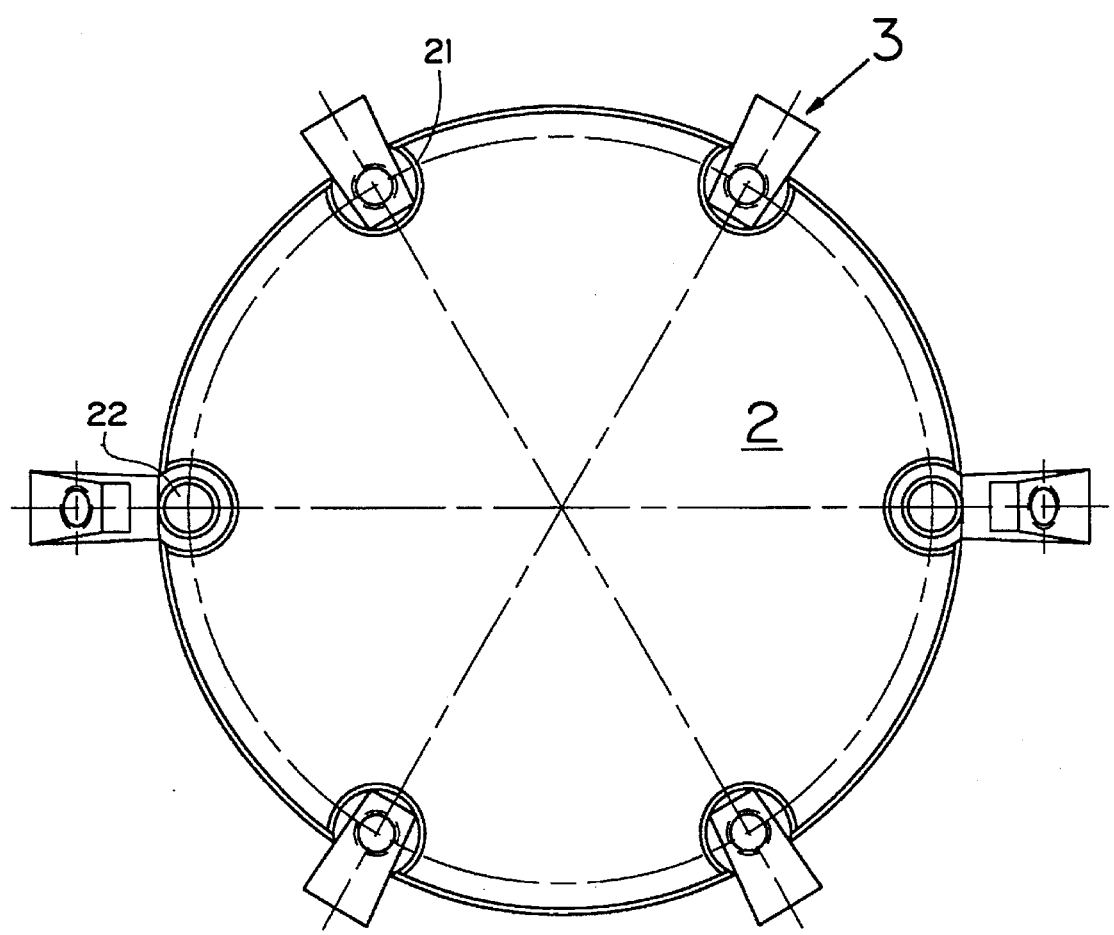
FIG. 2 is a top view of a closure in accordance with one embodiment of this invention with four closed and the two open clamping elements.
Figure 6:
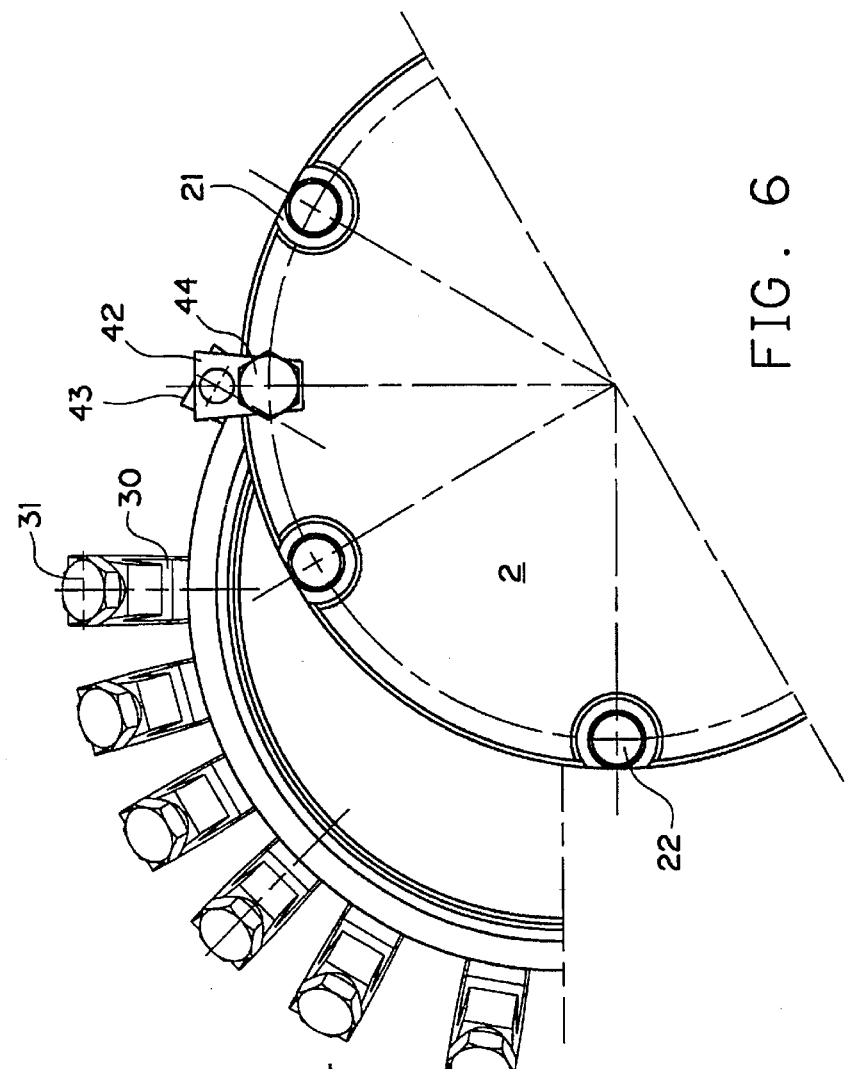
FIG. 6 is a top view of half of a closure in accordance with one embodiment of this invention with the cap partially pivoted away.

In accordance with one embodiment of this invention in which the closure comprises pivot hinge 4, the cap 2 can be turned laterally, as shown in FIG. 6, after the pressure screws 31 have been loosened, the clamping elements have been pivoted outward and have all been pushed together to one side of the pivot hinge 4.

The structural design of the closure of this invention is so simple that the entire closure can be efficiently manufactured from lathe-turned parts alone and made extremely cheaply.

We claim:

1. In a closure for pressure vessels, the closure having a collar (1) connectable to the pressure vessel and to a cap (2), a seal (5) disposed in an area where the cap (2) and the collar (1) contact each other, and a plurality of clamping elements (3) for generating the surface pressure between the collar (1) and the cap (2), the improvement comprising: a sealing flange (12) formed as one piece on the collar (1), said sealing flange (12) having a flat sealing surface (13) on a top side and a circumferential annular bead (15) at least partially circular in cross section along a bottom side, a plurality of C-shaped clamps (30) displaceably, releasably and form-fittingly connected to said circumferential annular bead (15), each of said C-shaped clamps comprising one pressure screw (31) and constituting one of said clamping elements (3), said plurality of C-shaped clamps in the operational state pressing on an edge portion of the cap (2) resting on the sealing flange (12) of the collar (1), an upper leg (32) of each of the C-shaped clamps (30) of each of the clamping elements (3) forming a threaded opening, and a lower leg (33) of each of the C-shaped clamps (30) having a mouth (36) positioned away from an opening formed by the upper leg (32), the lower leg (33) and a connecting part (34) of each of the C-shaped clamps (30), the mouth (36) comprising a radially, inwardly opened groove enclosing the annular bead (15) and the center axis of the threaded opening centrally intersecting the mouth (36) in the lower leg (33).

2. In a closure in accordance with claim 1, wherein the collar (1) is a ring weldable to the pressure vessel.

3. In a closure in accordance with claim 1, wherein the cap (2) has pressure surfaces (21) which are evenly distributed around the circumference, recessed in relation to the cap surface and form cup-shaped receptacles (22) adapted to receive the pressure screws (31) of the clamping elements (3).

4. In a closure in accordance with claim 1, wherein the edge portion of the cap (2) forms a circumferential positioning groove (26), which in the operational state of the closure is engaged by an interlocking, centered, annular bar (14) projecting beyond the sealing surface (13) of the sealing flange (12) at the collar (1).

5. In a closure in accordance with claim 4, wherein the annular bar (14) is disposed on the sealing flange (12) offset from an inner edge of said sealing flange (12) by at least the width of a groove (18) having a semi-circular cross section, into which an O-ring seal (5) is inserted.

6. In a closure in accordance with claim 5, wherein the underside of the cap (2) forms a circumferential groove (17) having a semi-circular cross section, which, in the operational state of the closure, is disposed above the groove (18) in the sealing flange (12) of the collar (1).

7. In a closure in accordance with claim 1, wherein each of the clamping elements (3) comprises a pin (37) which delimits the mouth (36) of the corresponding C-shaped clamp (30) providing a form fit of the mouth (36) around the annular bead (15) over more than 180°.

8. In a closure in accordance with claim 1, wherein the cap (2) is connected to the collar (1) by a hinge (4).

9. In a closure in accordance with claim 8, wherein the hinge (4) is formed within at least one of said clamping elements (3), the portion of said C-shaped clamp of said at least one clamping element (3) connecting an upper leg and a lower leg of the C-shaped clamp (30) being cut and connected along a hinge axis.

10. In a closure in accordance with claim 9, wherein the upper leg and the lower leg of said C-shaped clamp are connected by a dowel screw (41) surrounded by a spiral compression spring (46).

* * * * *